Jan. 14, 1930.  I. STERN  1,743,871
DENTURE ATTACHMENT
Filed Sept. 2, 1926
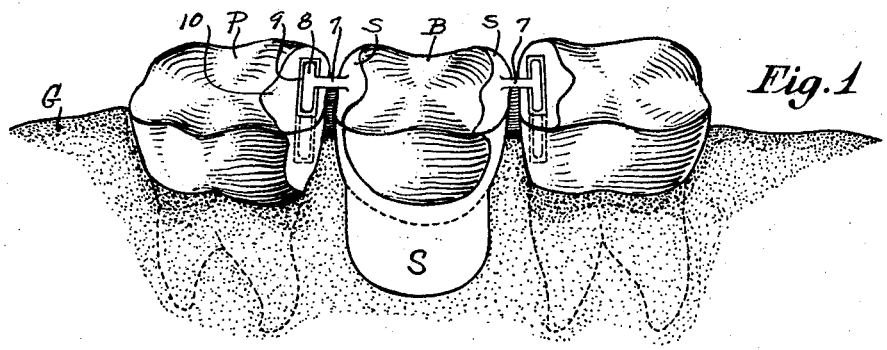
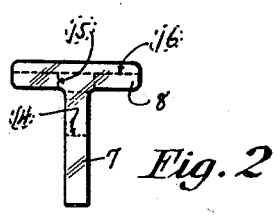
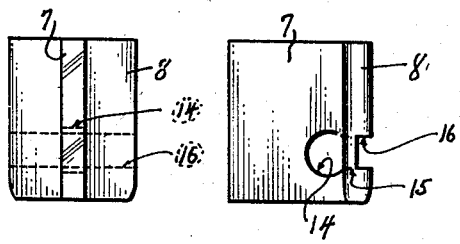
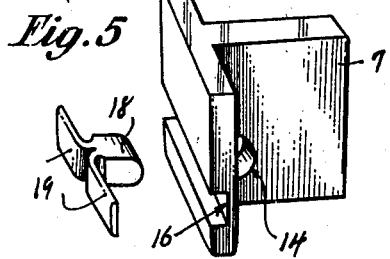
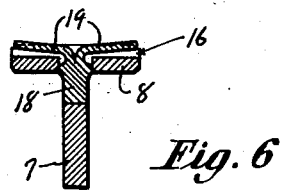
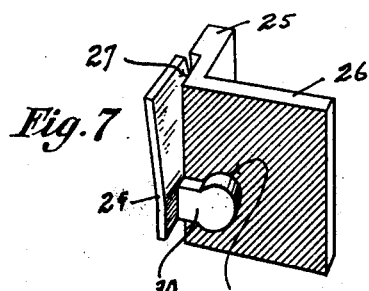
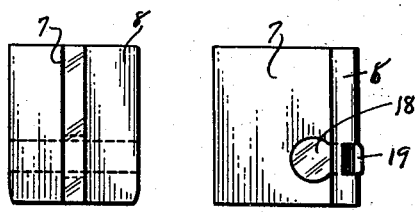
INVENTOR
ISIDORE STERN
BY
Bohleber + Ledbetter
ATTORNEYS Patented Jan. 14, 1930

1,743,871

UNITED STATES PATENT OFFICE

ISIDORE STERN, OF NEW ROCHELLE, NEW YORK

DENTURE ATTACHMENT

Application filed September 2, 1926. Serial No. 133,122.

This invention relates to dentistry and more particularly to improvements in adjustable denture attachments for use in connection with removable bridgework.

An object of the invention is to produce an improved adjustable denture attachment for use with removable bridgework, which attachment includes a new spring pressure means which may be easily and conveniently adjusted by a spreading operation so as to make the attachment fit more snugly into the pier tooth socket and take up for wear occasioned by use and service of the bridge; and adjustment may be made by the wearer of the bridge.

It is a further object to produce an adjustable denture attachment composed primarily of two parts, namely a support, which includes a head and shank in one piece, and a spring which support and spring are joined together in a novel way producing a new type bridge work denture.

It is still a further object to produce a denture attachment, the adjustable spring means or member of which is flexibly carried in the head, while that part of said spring which holds it in position, is anchored in the shank to the rear of the head. In this respect, it is an object to so construct the shank and make use of it that the anchorage of the spring itself is accomplished in the shank instead of in the denture head and for that reason the spring means itself may movably occupy a greater proportion of the head, and furthermore the head is not weakened by reason of anchoring the spring thereto as in many former types of dentures.

Furthermore, it is an object to produce a denture attachment which presents a plane solid surface on top so as not to mar or break the final occlusal surface formed by the denture and its receiving socket in the pier tooth inlay. To this end the spring member is mounted in the head between the head ends so the spring means is not exposed on the occlusal surface but is concealed in the head down in the pier tooth socket.

With the above and other objects in view, reference is now made to the accompanying drawing for a general understanding of the invention and for a description of one or more examples thereof.

Figure 1 shows a general assembly view of two spaced pier teeth or natural teeth in the gum structure of the patient with a removable bridge mounted therebetween and the bridge carries the new adjustable denture attachments forming the subject of this invention.

Figure 2 is a cluster view of the denture without its spring adjusting means, being a top, rear, and side elevation thereof before said spring is attached.

Figure 3 is a cluster view of the spring, being a top, rear, and side elevation thereof; and Figure 4 is a perspective view of the spring member.

Figure 5 is a separated or disassembled view of the spring and support mounted in aligned relation and ready to be pushed together for final assembly.

Figure 6 is a cluster view of the finished article, being an assembly of the denture and support, and shows a top section, rear elevation, and side elevation of the adjustable denture attachment in completed form.

Figure 7 is a modified form of the denture showing the spring mounted vertically in the head and comprising one spring wing instead of the two outstanding wings shown in former views; and this is a perspective section showing about half of the support but all of the spring.

Referring to Figure 1 for a general understanding of a removable bridge, there is shown spaced natural or pier teeth P usually remaining in the gum G of the patient. A bridge B is mounted between the pier teeth P and includes a gold saddle S of any suitable form and which saddle forms a permanent and rigid anchorage for a denture attachment and carries the bridge tooth or teeth B as well. The pier teeth are usually fitted with metallic or gold inlays 10 in which is embedded a socket receptacle 9 to receive a head 8 integrally included on the anchorage shank 7 of the attachment. The bridge B is removed by lifting it vertically out of its supporting sockets 9, and after suitable adjustment of its spring or springs, it is replaced and will then positively maintain its fixed position by reason of the adjustment or spread position of the spring in relation to the denture head.

Referring now more particularly to the denture part itself, I may prefer to form it of two parts having a general T-shaped construction. For example, Figure 2 shows the main T-shaped denture support part or base, and Figure 3 shows the T-shaped spring member. While I show these parts T-shaped as one example of my invention, the principle involved lends itself to other and sometimes more suitable shapes as shown in Figure 7, and the invention has many broad uses and can be adapted to all manner of restorative work.

The denture attachment base or support itself comprises a bridge anchorage shank 7 including a head 8 thereon, and the shank 7 is adapted to receive the shank of a spring member and rigidly anchor it to the support while the head 8 is provided with a groove or channel 16 in which spring wings of the adjustable element are confined and are adjustable and free to move and flex in relation to the head.

The bridge anchorage shank 7 is made with a spring shank receiving means near one end thereof which includes an aperture 14 which is preferably circular in form and which connects with an opening or passage 15 defined by parallel opposite edges which reach from the socket or aperture 14 of the shank 7 outwardly through the shank and through the head 8 to the face of the head where the said opening 15 joins the aforesaid groove 16 formed in the outer face of the head transversely of the plane of the shank 7. Thus I have produced a T-shaped denture support 7—8 having the long spring wing groove 16 adjoining a socket or opening 14—15 made in the shank 7. By going back into the shank 7 for a foundation on which to establish and anchor the spring, I do not weaken the head construction. By avoiding anchorage of the spring to the head 8 itself I leave the full surface of head to receive the relatively movable spring.

Coming now to a description of new and adjustable spring means itself which is shown in Figures 4 and 5, the spring member comprises a rigid shank 18 including outstanding spring wings 19 integrally formed on the shank and the general over-all construction is in this case T-shaped. The shank 18 of the spring 19 forms a sliding fit through the straight passage 15 and the wings 19 are movably received into the head groove 16. The spring part 18—19 is simple to manufacture and is rugged and durable, and is combined in a novel way with the support member 7—8.

The plan of assembly of the main denture attachment support base 7—8 with the spring member 18—19 is illustrated in Figure 5 wherein the parts are ready to be slidably fitted together one within the other and in Figure 6 there is shown a sectional plan of the joined parts, a rear elevation, and a side elevation to disclose the relation of the two parts after assembly and completion by a riveting operation.

When the shank 18 of the spring is inserted in the anchorage socket 14—15, it is obvious that clearance exists between the straight surface of the shank 18 and the circular wall of the aperture 14. The spring shank 18 may to advantage be slightly thicker than the wall of the support shank 7. A swedging or riveting operation is now executed against the thick shank 18 which bulges or swells it within the round anchorage socket 14 so as to positively anchor it in position. In this way I have produced a denture attachment wherein the anchorage of the spring to the main denture part is accomplished in the shank leaving the free outstanding wing parts 19 to flex across the entire face of the denture head. The pressing or squeezing in of the thick stock composing the spring shank 18 produces a positive immovable joint between the two shanks 7 and 18.

Among the several advantages of this invention, one is that the top edge of the attachment forms a solid unbroken occlusal surface because it is observed that the ends of the denture attachment are not obliterated in any way by reason of the spring adjustment means. In other words, the lower and upper end of the denture attachment is plane and completely fills the socket 9 and the spring 19 is therefore concealed down in the socket.

Furthermore, it is evident, with the spring or springs 19 mounted near one end of the denture head, that the dental mechanic who uses these devices for building up bridges may cut away as much of the attachment as he may desire at either end or at one end thereof without in any way interfering with the spring. For certain dental restorative cases, it may be necessary to have a comparatively short denture and to this end the dentist may trim or cut away a considerable amount of one end of the denture attachment without approaching the spring.

Adjustment of the denture attachment is accomplished by inserting a small adjusting tool, as for example a pin, screw-driver or other suitable instrument, into the groove 16 and then prying outwardly against the wing 19. This flexing of the springs is carefully executed until each spring 19 stands out slightly, as shown in Figure 6 whereupon the spring wings yieldingly press against the wall of the socket 9 when the bridge B is replaced in position. After considerable wear and use, the bridgework, i. e. the adjustable attachments thereof, may receive frequent adjustments if needed to maintain the bridge B in positive normal seated position.

Referring now to Figure 7 for a description of a modified form of the invention, there is shown a denture attachment support comprising a head 25 including a bridge anchorage shank 26. This denture attachment is provided with a spring wing receiving groove 27 and is also made with an anchorage socket 28 back in the shank behind the head 25. A spring wing 29 includes an integral shank 30 at one end thereof which is set into the socket 28 and swedged or riveted down until the shank 30 is flush and plane with the shank 26 and thus the two shanks 26 and 30 become one solid immovable part leaving the spring 29 at its free end free for adjustment in the groove 27 in relation to the denture head 25.

In the modified form of the invention, the shank 30 of the adjustable spring carries one spring wing only and the wing is disposed vertically in relation to the shank 26 and as the denture is thrust into a pier tooth socket, the spring 26 yieldingly presses against the socket wall and firmly anchors the removable denture together with its bridge in positive working position. Adjustment is readily accomplished by inserting a prying tool in the groove 27 under the spring 29 thereby slightly bending the spring 29 outwardly so that it possesses an inherent spring capacity and yieldingly resists and bears against the socket wall.

My invention fills the need felt for a durable denture attachment which is adjustable and wherein the heavier part as the shank 7 or 26 is designed to serve the double purpose of anchorage to the bridge and anchorage to the spring means.

What I claim is:

1. A denture attachment for removable bridge-work comprising a shank adapted to be joined to a dental bridge, a head carried therewith for reception in a pier tooth socket, an adjustable retaining member carried with the head and having anchorage means extending through the head and into the shank and means to secure the anchorage member to the shank.

2. A denture attachment for removable bridgework comprising in combination, a denture support including an anchorage shank adapted to be secured to a bridge and including a head to removably fit into a pier tooth socket, said head being provided with spring receiving means, said shank being provided with an aperture and a passage leading to the spring receiving means, an adjustable spring movably confined in the receiving means of the head, and a shank integral with the spring which shank fits into the passage and aperture and is anchored thereinto and is thus rigidly secured to the anchorage shank to the rear of the head but the spring is not fixed to the head.

3. A denture attachment for removable bridgework comprising in combination, a denture support including an anchorage shank adapted to be secured to a bridge and including a head to removably fit into a pier tooth socket, said head being provided with a groove, and said shank being provided with an aperture which connects with the groove, a spring mounted for free movement in the groove, and a shank integral with the spring which shank fits into the aperture and is anchored therein to the rear of the grooved head.

4. A denture attachment comprising in combination, a bridge support part and a spring part carried thereon, one part of which is made T-shaped, and the other part of which includes a head adapted to fit into a pier tooth socket and a shank to join to a bridge, means reaching through the head and into the shank to mount the spring flexibly free on the head and means to anchor said last named means in the shank.

5. A denture attachment for removable bridgework comprising, in combination, a support member having a shank adapted to be anchored to a bridge and a head adapted to fit into a pier tooth socket, a spring disposed in adjustable relation to the head and having a shank which extends through the head and into the shank and means anchoring the shank of the spring to the support shank accessible from a side of the support shank.

6. A denture attachment for removable bridgework comprising, in combination, a support member having a shank adapted to be anchored to a bridge and a head adapted to fit into a pier tooth socket, said head being formed with a passage opening into a recess into said shank, a spring having a shank extending through said passage into the recess in which the end of the shank is anchored from outside the shank to leave the spring flexibly free on the head.

7. A denture attachment comprising, in combination, a bridge support part and a spring part carried thereon, one part of which is made T-shaped and the other part of which includes a head adapted to fit into a pier tooth socket and a shank to join to a bridge, and means reaching through the head into the shank and up-set therein to anchor said means in the shank whereby the spring is mounted flexibly free on the head.

In testimony whereof I affix my signature.

ISIDORE STERN.